Patented Sept. 14, 1954

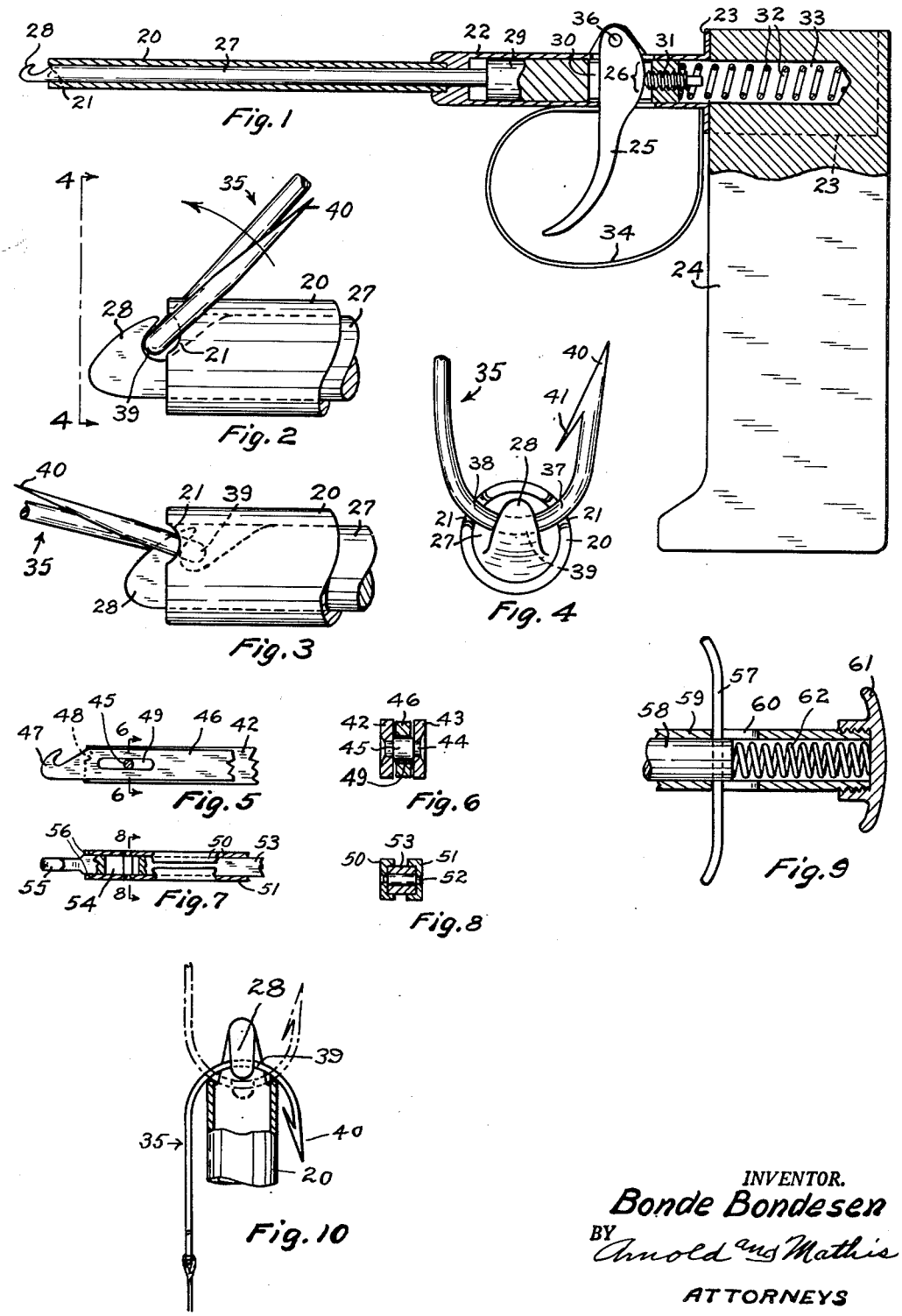

2,688,816

UNITED STATES PATENT OFFICE 2,688,816

FISHHOOK REMOVER

Bonde Bondesen, Enumclaw, Wash.

Application December 5, 1949, Serial No. 131,170

6 Claims. (Cl. 43—53.5)

My invention relates to a fish hook remover.

More particularly, my invention relates to a means for quickly reversing the direction of the hook, and thereby the barb so that the hook may be readily removed from the mouth of the fish after being caught.

In catching fish, particularly large sized fish, there are times when the hook becomes lodged well within the tissues of the gullet. To remove the same, it is important that the shank of the hook be turned, as it were, down the throat in order to reverse the barb so as to free the hook from the tough gullet lining.

The common practice of removing the hook by means of cutting out the tissue often is dangerous, particularly with large sized fish such as salmon, of having the fish close its mouth and the sharp teeth may well cause serious infection as well as other injury to the fingers. If the knife is used in cutting out the hook, there is danger of nicking the leader of the fish line and thereby weakening it so that it is no longer of use. Also, there is considerable waste of time in so doing as care must be used in avoiding the teeth of the fish. At a time when fish are bitting, it is highly important to get the hooks back into the water as fast as possible. Also, in commercial trolling for salmon, the operator may have several fish on different leaders secured to the main line at different levels and therefore unnecessary time consumed in removing the hooks results in a considerable loss of fish that otherwise might be caught due to the fact that the lines are out of the water.

Furthermore, a most important feature of my invention is its saving of fish. By providing the device of the character of my invention, it operates to remove the fish hook from the mouth of a fish with a minimum of injury to the same, and also makes it possible to remove the hook in the minimum of time. In the case of a tender mouthed species of fish, as a trout, both of these features are important in the case of an undersized (under legal limit) fish which must be put back in the water. If the fish is to continue living, the removal of the fish hook must be done in a manner characterized by both of said features, non-injury and quickness of time.

Furthermore, such operations may be necessarily carried on under conditions of a heavy rolling sea when it is almost impossible to stand in the rear of the boat. Under such conditions, it is difficult to operate on the throat of the fish to remove the hook. If it is attempted to remove the hook by pulling it out, the hook is liable to become bent or deformed so that its efficiency is greatly diminished.

It is a primary purpose of my invention to provide a fish hook remover to meet all of the above conditions so that the hook may be removed without injury to the mouth of the fish and this be done very expeditiously and without danger of injury to the fingers or hand of the operator.

The above-mentioned general objects of my invention, together with others inherent in the same, are attained by the device illustrated in the following drawings, throughout which like reference numerals indicate like parts:

Figure 1 is a view in longitudinal section of the device embodying my invention;

Fig. 2 is an enlarged view of the end portion of the device when the first gripping of the hook occurs;

Fig. 3 is an enlarged view of the end portion of the device when applied to a fish hook after further pressure is applied subsequent to the position shown in Fig. 2, showing how the point of the hook is turned in a direction opposite to that of the hook;

Fig. 4 is an end view of the end of the tube and hook member of the device engaging the curved pointed portion of a fish hook looking in the direction of 4—4 of Fig. 2;

Fig. 5 is a view of the end portion of the modified form of my invention having two parallel guide members in place of a tube;

Fig. 6 is a view in cross-section on line 6—6 of Fig. 5;

Fig. 7 is a view of the end portion of another modified form of my invention;

Fig. 8 is a view in cross-section on line 8—8 of Fig. 7;

Fig. 9 is a view of a modified form of grip or handle means for operating the hook member of my invention; and Fig. 10 is a front view in section of the end portion of the guide tube and hook engaging the fish hook in full line and the hook turned in dotted line.

A tube or hollow guide 20 with generally oppositely disposed notches 21 or fulcrum surfaces is mounted in a tube mounting member formed with a tube portion 22 and a forked portion 23. In the forked portion is received the handle 24. On the tube 22 is pivotally mounted a trigger 25 having a cam portion 26.

Within the tube 20 is a rod 27 having a hook 28 with a tip having its inner face or surface inclined toward the adjacent and opposite end of the tube 20. The rod 27 may have a piston member 29 in which is a slot 30 through which the trigger 25 extends. In the end of the piston member 29, an adjustment screw 31 may be mounted which may also serve as a guide for the spring 32 which may be mounted in a recess 33 in the handle 24. A guard 34 may be provided for the trigger 25, which together with the handle 24 may serve as a stiffening support to the tube mounting member 22 and also assist with the gripping of the handle 24 in twisting the tube 22 together with its tube 20 when in the mouth of the fish. The guard 34 also keeps those fingers not operating the lever 25 out of the way of its operation.

The mode of operation of the fish hook remover of my invention is as follows:

The tube 20 with the hook 28 in the position shown in Fig. 1 is inserted in the mouth of a fish and the hook member 28 pulled back in engagement with the curved point portion of the hook 35. The pulling back is accomplished as follows: The trigger 25 is pulled rearwardly pivoting at 36 and the cam portion 26 is caused to bear against the end of the screw 31 thereby contracting the spring 32, which spring operates to keep the hook in the extended-most position as shown in Fig. 1. The first gripping of the hook is shown in Fig. 2. This causes spaced apart portions 37 and 38 of the fish hook to come into engagement respectively with the generally oppositely disposed notches or fulcrum surfaces 21 of the tube, so that the curved portion (see Fig. 10) is engaged off center of the longitudinal axis of the fish hook said surfaces or notches providing a fulcrum bearing in reversing the hook. Thereafter as the segment 39 of the curved portion of the fish hook is pulled into position, as shown in Fig. 3, the fish hook is turned with the point in the opposite direction to the movement of the hook 28 during retraction so that the fish hook takes the position shown in Fig. 3. With the point 40 of the hook pointed down the throat (position shown in Fig. 3) it is then possible to withdraw the hook 35 from the mouth and this without danger incident to placing the fingers within the mouth of a fish in attempting to free the hook from the membrances of the mouth of the fish. The barb 41 will be pointed upwardly of the throat and will be shielded from engagement with the tissues of the mouth of the fish by being on the inner side of the hook proper. Also, the removal of the hook is done very speedily and this is important in order to get the equipment back into the water as promptly as possible for the catching of further fish. Sometimes the striking period for the fish on a given day is quite limited, and therefore it is desired to be able to remove the caught fish from the hook as promptly as possible without danger of twisting or damaging the gear.

Also speed of operation in the case of a tender mouthed fish as a trout which is undersized and must be replaced in the water is of utmost importance if the fish is to live. The mouth of such a fish must not be seriously injured if it is to continue living and my invention provides for all this.

Instead of a tube 20, in the modified form shown in Figs. 5 and 6, parallel rectangular hollow guide members 42 and 43 are provided with a pin 44, preferably having an enlarged central section 45, which holds these in parellel spaced relation as respects the end portion of said guide members. Instead of the rod-like member 27, in this modified form a rectangular rod-like member 46 is provided with a hook 47 which may be retracted between the parallel guide members 42 and 43. Said guide members are provided with generally oppositely disposed notches or fulcrum surfaces 48 corresponding in their function to generally oppositely disposed notches 21. The rod member 46 is provided with a slot 49, the walls of which are engaged by pin 44.

In the modified form shown in Figs. 7 and 8, parallel channel members 50 and 51 are provided in place of the tube 20, and are held together as respects their end portion by means of a pin 52. Within the channel formed between members 50 and 51 a rod member 53 is slidably mounted by means of a slot 54 which may be of similar construction to that shown in the rod member 46 of Fig. 6. On the end of rod member 53 is a hook 55 engageable with generally oppositely disposed notches 56.

In the modified form shown in Fig. 9 instead of the handle 24 a gripping member and rod operating mechanism is shown comprising a gripping plate 57 carried by rod 58 corresponding to rod 27 in Fig. 1. This rod is mounted in a tube 59 corresponding in function to tube 20 of Fig. 1, in which tube there is a slot 60 in which the gripping plate 57 moves. Cap 61 in the form of a handle is threadedly mounted on the tube 59. A spring member 62 presses apart the cap 61 and the rod 58. Thus is provided a simplified form of grip and handle, or actuating means.

Obviously, changes may be made in the forms, dimensions, and arrangement of the parts of my invention without departing from the principle thereof, the above setting forth only preferred forms of embodiment.

I claim:

1. A fish hook remover comprising a hollow guide having two notches formed on one end portion thereof in spaced relation to and on the same side of a diametrical line through the axis of said guide to receive spaced apart portions of the bend of a fish hook and a rod reciprocably mounted in said guide having its free end portion in the form of a hook having a curved inner face in offset relation to said notches and forming a cam to coact with the bend in said fish hook and the notched end of said guide to reverse the position of said fish hook as said rod is reciprocated in said guide.

2. A fish hook remover comprising a hollow guide having like fulcrum surfaces on one end portion thereof in spaced relation to and on the same side of a diametrical line through the axis of said guide to contact spaced apart portions of the bend of a fish hook; a rod reciprocably mounted in said guide having its free end portion in the form of a hook having a curved inner face in offset relation to said surfaces and forming a cam to coact with the bend in said fish hook to reverse the position of said fish hook as said rod is reciprocated in said guide, said fulcrum surfaces acting as a bearing for parts of the fish hook in reversing the same.

3. A fish hook remover comprising a hollow guide having two notches formed on one end portion thereof in spaced relation to and on the same side of a diametrical line through the axis of said guide to receive spaced apart portions of the bend of a fish hook; and a reciprocable rod in said guide having its free end portion of reduced transverse dimension and in the form of a hook having an inner face adjacent said hook point inclined backwards towards said end, said notches cooperating with the hook on said rod in reversing the position of said fish hook as said rod is reciprocated.

4. A fish hook remover comprising a hollow guide having like fulcrum surfaces on one end portion thereof in spaced relation to and on the same side of a diametrical line through the axis of said guide to contact spaced apart portions of the bend of a fish hook; and a reciprocable rod in said guide having its free end portion of reduced transverse dimension and in the form of a hook having an inner tip face inclined towards the fulcrum surfaces, said fulcrum surfaces cooperating with the hook on said rod in reversing the position of said fish hook as said rod is reciprocated.

5. A fish hook remover comprising a hollow guide having two notches on one end portion thereof located laterally in spaced relation to and on the same side of a diametrical line through the axis of said guide and of a size sufficient to permit said notches to loosely receive simultaneously spaced apart portions of the bend of a fish hook; and a rod reciprocably mounted in said guide having its end portion of reduced transverse dimension and forming a hook with its inner face smooth and of a size which in reciprocating receives the center portion of the bend of a fish hook in transversely offset relation as respects said notches when the point of the fish hook is directed in general towards the end of the guide opposite the end having the notches, said notches cooperating with the hook on said rod in reversing the position of said fish hook as said rod is reciprocated.

6. A fish hook remover comprising a hollow guide having fulcrum surfaces on one end portion thereof located laterally in spaced relation to and on the same side of a diametrical line through the axis of said guide and of a size sufficient to permit said surfaces to loosely contact simultaneously spaced apart portions of the bend of a fish hook; and a rod reciprocably mounted in said guide having one end portion of a reduced transverse dimension and forming a hook with its inner face smooth and of a size which in reciprocating loosely receives the convex center portion of the bend of a fish hook in transversely offset relation as respects said surfaces when said center protrudes beyond the end of said guide while portions of said bend are in contact with the said surfaces, said fulcrum surfaces cooperating with the hook on a said rod in reversing the position of said fish hook as said rod is reciprocated.

References Cited in the file of this patent

UNITED STATES PATENTS

| Number | Name | Date |
| --- | --- | --- |
| 1,240,901 | Symons | Sept. 25, 1917 |
| 1,539,221 | Tennant | May 26, 1925 |
| 2,102,287 | Smethers | Dec. 14, 1937 |
| 2,289,767 | Ford | July 14, 1942 |
| 2,289,810 | Tallmadge | July 14, 1942 |
| 2,507,083 | Anderson | May 9, 1950 |
| 2,512,818 | Wikarshi | June 27, 1950 |